United States Patent [19]
Hughes

[11] Patent Number: 4,897,849
[45] Date of Patent: Jan. 30, 1990

[54] COMPACT SLAB LASER OSCILLATOR-AMPLIFIER SYSTEM

[75] Inventor: John L. Hughes, Melbourne, Australia

[73] Assignee: Austral Asian Lasers Ltd., Melbourne, Australia

[21] Appl. No.: 231,511

[22] Filed: Aug. 12, 1988

[51] Int. Cl.$^4$ .............................................. H01S 3/06
[52] U.S. Cl. ......................................... 372/66; 372/93
[58] Field of Search ....................... 372/66, 41, 69, 70, 372/72, 73, 75, 99, 97, 34, 93; 330/4.3

[56] References Cited

U.S. PATENT DOCUMENTS

| | | | |
|---|---|---|---|
| 3,750,670 | 8/1973 | Palanos et al. | 330/4.3 |
| 4,132,955 | 1/1979 | Hughes | 330/4.3 |
| 4,589,118 | 5/1986 | Suzuki et al. | 372/70 |
| 4,644,555 | 2/1987 | Amano | 372/66 |

*Primary Examiner*—Frank Gonzalez
*Attorney, Agent, or Firm*—Edwin D. Schindler

[57] ABSTRACT

A compact laser oscillator-amplifier system comprising an oscillator section including slab laser medium (1) with laser beam reflecting coating (4) operating in an open cavity configuration with a bevelled substrate (8) having laser beam reflecting surface (7) and including bevelled end surfaces (11) and end mirrors (12). Coupled to the laser oscillator via polarizing prism (14) and mirror (15) is an amplifier section of similar construction which includes slab laser medium (2). The oscillator and amplifier laser media (1, 2) are excited by a common optical excitation source (3) which is positioned between the oscillator and amplifier sections and which directs light through optical filters (9) to the laser slabs (1, 2).

8 Claims, 3 Drawing Sheets

COMPACT SLAB LASER OSCILLATOR-AMPLIFIER SYSTEM

BACKGROUND OF THE INVENTION

1. Field of the Invention

This invention relates to a compact, optically interconnected laser oscillator-amplifier system consisting of a water cooled, "O" ring sealed, active mirror slab laser medium acting as the oscillator gain medium and a second, water cooled, "O" ring sealed, active mirror slab laser medium acting as the amplifier, the two said slabs being positioned one on each side of a water cooled optical excitation source, their respective output faces being parallel to laser beam reflecting mirrors of rectangular cross-section which allow for the laser beam being generated and amplified within said system to undergo multiple reflections within the space defined by the mirrored back surface of the slab and the mirrored front surface of the said rectangular mirror, two edges of said rectangular mirrors being bevelled and configured to allow a laser beam of either circular or elliptical cross-section to be amplified via multiple passages through said excited slabs, the laser beam output of said slab laser oscillator being routed via reflections off optical components into the slab amplifier where it is emitted in amplified form as a high quality laser beam. The invention has applications as a compact, powerful laser beam generator in defence, industrial and medical laser systems and can be operative in either the pulsed or continuous wave mode.

2. Description of the Related Art

Prior art laser oscillator-amplifier systems capable of powerful laser beam outputs were bulky, utilised separate optical excitation means, were of rod-rod, rod-slab and slab-slab configuration, with the laser beams generated and amplified within the bodies of said rods and slabs, particularly at high repetition rate firing of said system, leading to severe distortions of said laser beam outputs and severe optical path misalignment causing the emitted, distorted laser beam to exhibit severe beam pointing errors which could only be corrected by complex, bulky and inefficient phase conjugator mirrors.

SUMMARY OF THE INVENTION

The present invention overcomes the severe limitations of prior art laser oscillator-amplifier systems in providing a very compact, powerful laser beam generator utilizing a common optical excitation souce for both oscillator and amplifier units whose gain media, being in the form of active mirrored, external cavity slabs allow for the efficient generation and amplification of the laser beam with minimal distortion, said slabs being larger than the dimensions required to accommodate said laser beam in order to minimise thermally induced distortions and also to facilitate the fluid cooling with edge or face mounted "O" ring seals. The output beam of the invention has both high quality and high pointing stability at either high pulse repetition rates or high continuous output power.

The inventor was one of the first to field test laser radar systems, the work being carried out in 1964 by the laser radar group at the Royal Radar Establishment, Malvern, United Kingdom, on the Army Proof Range, Lark Hill on Salisbury Plains over a targeted range of 4.3 kilometers. The ruby rod laser transmitters available in 1964 were bulky and so inefficient that high quality shots had to be spaced by ten minutes. However, by operating at night, with observers near the targets which accommodated the beam, it was shown that pointing accuracy was good only at very slow pulse repetition rates. Also the ruby laser transmitter had to operate just above threshold for the production of quality beams and minimal component damage. During the course of those comprehensive field trials of laser radar, it became abundantly clear that an urgent need existed for a compact laser beam transmitter which could operate at high power levels, both pulsed and continuous, emit high quality laser beams with high pointing accuracy in the visible region of the electro-magnetic spectrum which matched the peak sensitivity of available detectors. Since experience had shown that the oscillator should be well under-run for the best results, but high mean powers were very desirable for the tracking of targets in particular, it became abundantly clear that the laser oscillator-amplifier combination was the solution. However, to consider the extremely bulky and inefficient laser oscillator-amplifier systems of the 1960's together with their inherent beam distorting and beam wandering characteristics was out of the question for field use.

It proved to be no simple task to develop a compact, portable laser oscillator-amplifier system capable of emitting stable, high quality laser beams at high mean power required for laser radar applications. In fact many prior art laser beam transmitters have dispensed with the amplifier concept altogether and have concentrated on severely distorted rod laser oscillators, in some cases utilizing these very distortions to extract the laser beam from the oscillator optical cavity. In an effort to increase the mean power outputs of laser beam transmitters, the General Electric Company developed face pumped slab lasers with the optical path of the laser beam undergoing amplification undergoing zig-zag reflections inside the slab itself with severe beam distortions occurring as the diameter of the laser beam was increased to accommodate more power. The present invention evolved from the use of thin, active mirrored slab laser media in an external cavity configuration to minimise thermal distortions. The laser oscillator produces a pulsed or continuous wave laser beam output at the lowest possible power levels consistent with the highest possible laser beam quality and pointing stability. This oscillator output beam is then routed via rigidly mounted optical components into the slab amplifier which is of similar structure to the slab oscillator but can be of much greater dimensions to accommodate the much more powerful laser beams, particularly at its output end. For lower power applications both the oscillator and amplifier slabs can be of similar dimensions whilst for the higher power application the amplification slab is much larger. The system is particularly compact when using laser beams of elliptical cross-section which match the rectangular geometry of the slabs. The excitation sources can be flashtubes, arc lamps, photo-emitting diode arrays, laser diode array or any combination of these. When using flashtubes and arc lamps, narrow band reflective and absorption filters have to be used to allow a good match of the excitation light into the narrow absorption bands of the laser gain medium, thus minimising thermally induced distortions. It is a simple, and necessarily simple, process to remove the excitation sources without upsetting the optical alignment of the invention in any way and also without breaking the water tight "O" ring seal on the slab or laser mirrors as the case may be, it being borne in mind that the optical excitation source has the lowest lifetime of all the components in the invention and may have to be replaced in the field between services. The invention is compact enough to be handheld so is man portable, does not take up scarce volume in expensive defence vehicles and provides a powerful laser beam generator which can be attached to the end of robotic arms in industry.

OBJECTS OF THE INVENTION

It is an object of the invention to provide a laser beam generator which emits laser beam outputs of high quality at high beam pointing accuracy at high pulse repetition rates of between 10 and 1,000 Hz at high peak power per pulse exceeding 10 gigawatts.

It is also an object of the invention to provide a compact and powerful laser beam generator with a continuous wave output between 10 watts and 1,000 watts in power with high quality laser beams and high pointing accuracy.

It is an object of the invention to provide an optically coupled configuration of oscillator and amplifier slab gain medium which are excited from a single source of water cooled excitation radiation.

It is an object of the invention to provide laser beam outputs from laser gain medium which are operating under minimal thermal stresses.

It is an object of the invention to provide output laser beams of circular cross-section.

It is also an object of the invention to provide output laser beams of elliptical cross-section.

Yet another object of the invention is to provide a powerful, compact laser beam generator in which it is a relatively simple process to replace the excitation source without affecting the optical alignment of the optical components in the system.

BRIEF DESCRIPTION OF THE DRAWINGS

A better understanding of the invention may be obtained from the following considerations taken in conjunction with the drawings which are not meant to limit the scope of the invention in any way.

DETAILED DESCRIPTION OF THE INVENTION

Figure 1:
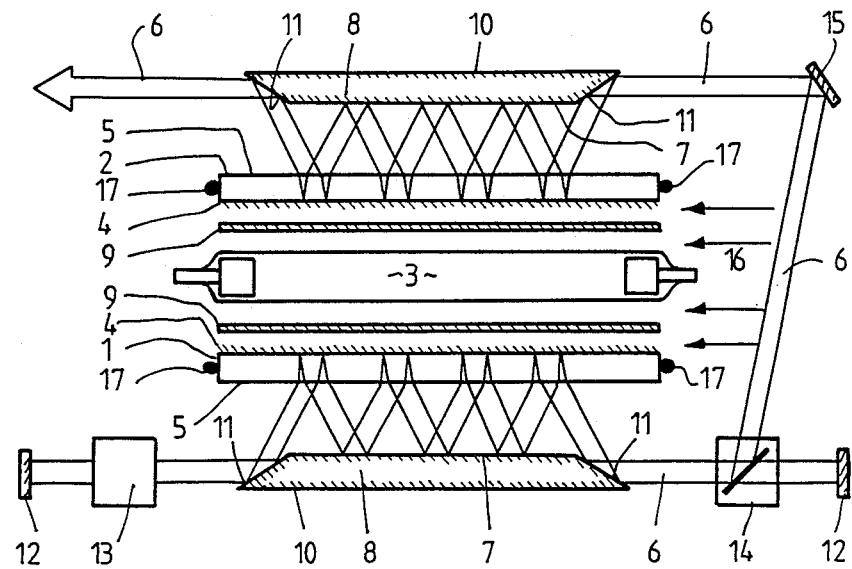
FIG. 1 shows the overall layout of the invention with the laser oscillator and amplifier sections positioned on either side of a well filter and water cooled optical excitation source.

In FIG. 1, numeral 1 indicates the laser oscillator slab medium whilst numeral 2 indicates the amplifier slab medium of equal dimensions. For example, with a neodynium doped yttrium aluminium garnet crystal slab typical dimensions currently available are 100 millimeters by 20 millimeters by 7.5 millimeters. Numeral 3 indicates an optical excitation source which is shown as a flashtube but can also be an array of such flashtubes to match the available surface of the slabs in as compact a manner as possible, said optical excitation source can also be in the form of an arc lamp or an array of said arc lamps or in the form of semiconductor light sources be they arrays of photo-emitting diodes or arrays of laser diodes. Light source 3 can also be in the form of a combination of flashtubes and semiconductor light source arrays, the flashtube bringing the slabs up to lasing threshold and the semiconductor light sources increasing their excitation well above lasing threshold in a manner which does not induce self-oscillations in said slabs prior to the amplification of the laser pulse taking place. Such sequential excitation of slab laser media are described in U.S. Pat. No. 4,132,955 issued to John Leonard Huges. In FIG. 1, numeral 4 indicates the laser beam reflecting mirror attached to slabs 1 and 2 which allows the light output of the source 3, matching the optical absorption bands of the lasing ions in slabs 1 and 2, to pass into said slabs. Numeral 5 indicates the antireflection coating deposited onto the input surfaces of slabs 1 and 2 to minimise the laser beam reflection losses at these interfaces both from the viewpoint of the laser beam itself and any spontaneous optical noise emitted by the said lasing ions within said slabs from growing into self oscillations which would deplete the inverted population of the excited slabs for the amplification of the laser pulses. Numeral 6 indicates the laser beam path from within the laser oscillator routed to the amplifier and outputting from the invention as the amplified beam. Numeral 7 indicates a laser beam reflecting mirror on the bevelled substrate indicated by numeral 8. Numeral 9 indicates an optical filter to absorb and reflect that portion of the output spectrum of light source 3 which does not match the absorption bands of the laser ions in slabs 1 and 2. Filter 9 allows the passage of the said excitation light matching the laser ion absorption bands with maximum transmission. Filter 9 also acts as a means of separating the water flows cooling slabs 1 and 2 and that cooling light source 3 respectively. In FIG. 1, numeral 10 indicates a reflective mirror which reflects the narrow band excitation light which may have passed through slabs 1 and 2 and absorbed back into the said slabs for further absorption.

Numeral 11 of FIG. 1 indicates a laser beam reflecting mirror deposited on the bevelled edges of the mirror substrate 8 to direct the laser oscillator beam path into and out of the said slabs 1 and 2 respectively. The dimensions of the bevelled edges of substrate 8 depend on the diameter of laser beam 6 of circular cross-section or the major and minor axes of beam 6 of elliptical cross-section. Due to the rectangular symmetry of slabs 1 and 2 it should be noted that the elliptical cross-section of beam 6 is a good match allowing for very compact configurations. Numeral 12 indicates laser beam reflectors defining the optical cavity of the laser oscillator section of the invention. Numeral 13 indicates an electro-optic switch to Q-switch said laser oscillator when it is operated in the pulsed mode and numeral 14 indicates an optical polarizing prism to deflect the laser output pulse out of said laser oscillator cavity when switch 13 is activated during the excitation sequence of said laser oscillator. Numeral 15 indicates a laser mirror which directs the unexpanded laser oscillator output 6 into the laser amplifier section. Numeral 16 indicates the fluid flow used to cool both light source 3 and slabs 1 and 2. Numeral 17 indicates the "O" ring positioned around the appropriately ground edges of slabs 1 and 2 to seal said slabs into the mechanical housing of the invention (not shown). This sealing configuration allows for the maximum surface area of the slab faces to be utilized with the locking plate (not shown) utilizing less than 1 millimeter of the optically polished faces of said slabs 1 and 2 to ensure water leak proof sealing of said slabs. It should be noted that the light excitation source 3 can be replaced without affecting the optical alignment of the invention.

Figure 2:
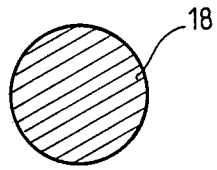
FIG. 2 shows a laser beam of circular cross-section.

In FIG. 2, numeral 18 indicates the circular cross-section of the laser beam 6.

Figure 3:
FIG. 3 shows a laser beam of elliptical cross-section.

In FIG. 3, numeral 19 indicates the elliptical cross-section of laser beam 6.

Figure 4:
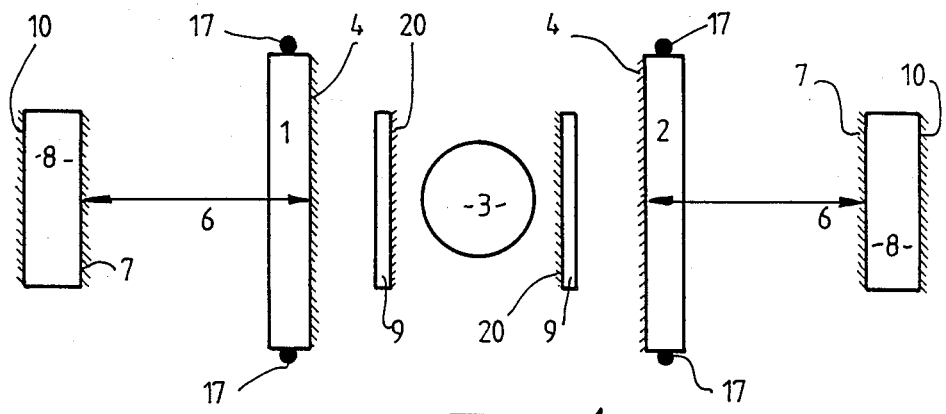
FIG. 4 shows the cross-section of the invention as shown in FIG. 1 with an oversized slab, relative to the dimension of the laser beam being generated and amplified, being in separate cooling chambers, isolated with optical filters, to the optical excitation source.
Figure 5:
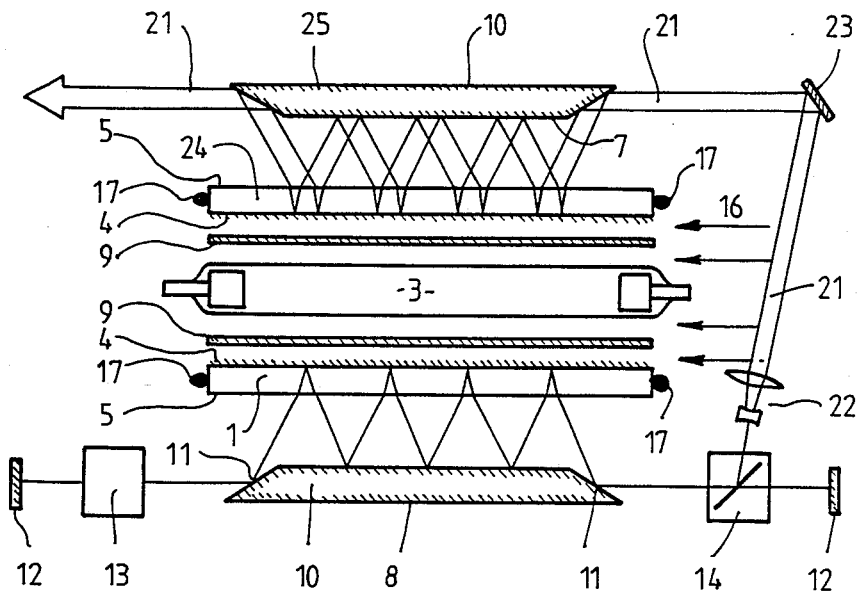
FIG. 5 shows the invention with beam expanding optics between the oscillator and amplifier sections which allows for a smaller oscillator section compared to the size of the amplifier section where the beam gains rapidly in power.
Figure 6:
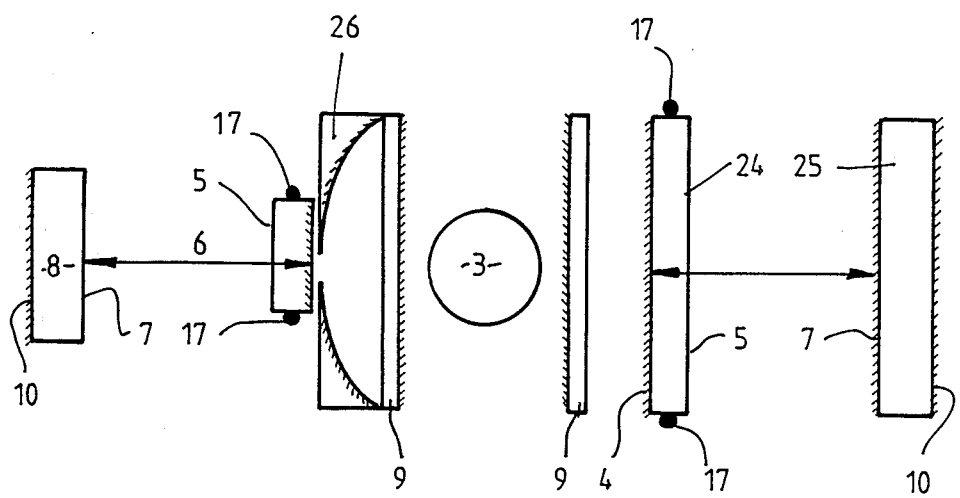
FIG. 6 shows a cross-section of the invention as depicted in FIG. 5 with the addition of the excitation light reflector which redirects most of the excitation light directed at the oscillator slab back towards the amplifier slab.

In FIG. 4, the cross-section of the components of FIG. 1 are shown with their relative dimensions. It should be noted that slabs 1 and 2 are much larger than substrates 8 because this leads to minimal thermal distortion of the volume of slabs 1 and 2 actually used for laser beam amplification in the invention where beam quality rather than total power is the goal. In FIG. 4, numeral 20 indicates a dielectric film stack deposited on optical filter substrate 9 which matches to absorption bands of the lasing ions in slabs 1 and 2 reflecting all other bands except said absorption bands which it passes with as high an efficiency as possible within the state of the art of a particular time. Currently such a coated substrate would pass about 45% of the incident light matching said absorption bands of Xenon flashtube light source 3. In FIG. 5 the laser output beam 6 is expanded into the larger laser beam indicated by numeral 21 via the beam expanding telescope indicated by numeral 22. Numeral 23 indicates the beam turning mirror for the expanded beam which directs it into the amplifier slab indicated by numeral 24 which now differs in size to slab 1 with the bevelled laser mirror indicated by numeral 25. FIG. 6 presents a cross-sectional view of the invention as shown in FIG. 5 where it is clearly shown that slab 1, the laser oscillator slab, is much smaller than the amplifier slab 24. Also mirror substrate 6 is much smaller that the amplifier substrate mirror indicated by numeral 25. Numeral 26 shows a concave reflector used to redirect the output of light source 3 into slab 24 because only a small portion of the output of 3 is required to excite 1 in this configuration of the invention.

Figure 7:
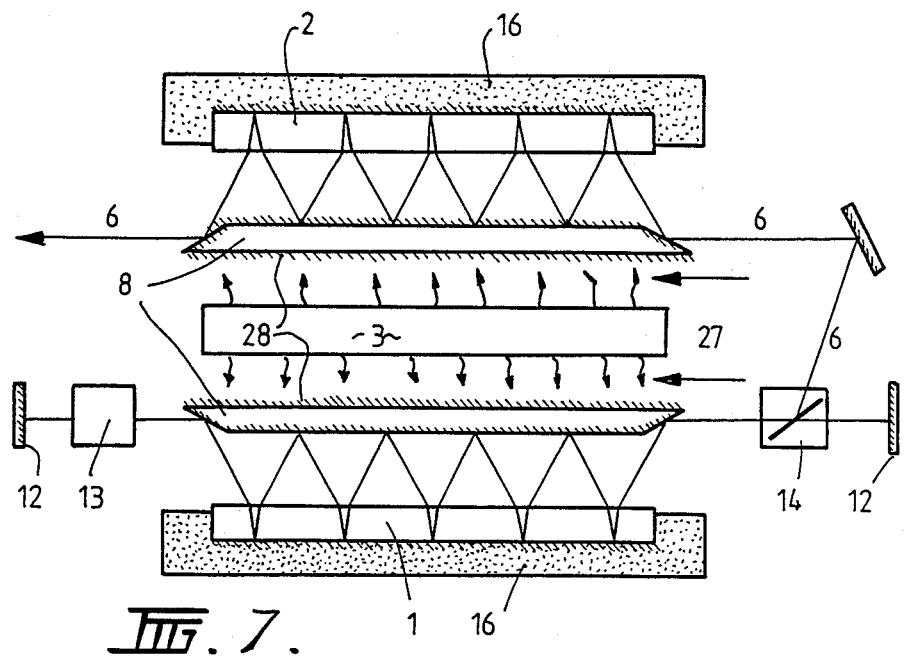
FIG. 7 shows an alternative arrangement of the invention with the position of the slabs and rectangular laser mirrors reversed and the flashtube/arc lamp replaced with an array of semiconductor light sources.

FIG. 7 shows a configuration of the invention excited by a semiconductor light source 3 and with the position of substrate 8 and slabs 1 and 2 reversed. The rear face of substrate 8 is now coated with a reflective filter indicated by numeral 28 which reflects all unwanted emissions from optical source 3 except the matching narrow band excitation light.

Figure 8:
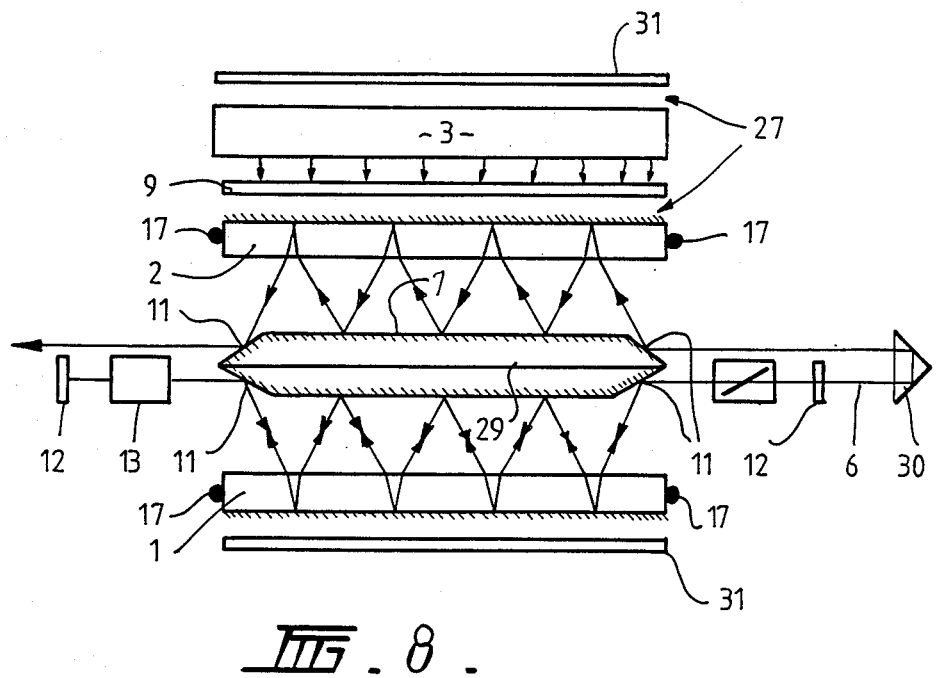
FIG. 8 shows an arrangement of the invention where both oscillator and amplifier slabs are optically excited with an array of semiconductor light sources positioned on the other side of the amplifier slab to the oscillator slab and a double surface laser beam reflecting mirror.

In FIG. 8 is shown an arrangement of the invention with the semiconductor light source 3 optically exciting slab 1 through slab 2. Here Numeral 29 indicates a two sided verson of mirrored substrate 8 placed between slabs 1 and 2. Numeral 30 indicates a 90° turning prism to turn the oscillator output beam 6 from the oscillator sector by 180° into the amplifier section. Numeral 31 indicates the outer wall of the invention's casing which contains water flows 16 and 27 respectively.

The invention has uses where a compact source of powerful laser pulses is required from solid state laser media. Minimal thermal distortions of the laser media of the invention allows for high repetition pulse generation and amplification rates. With, for example, the laser oscillator generating 0.1 joules of laser pulse energy per pulse and the amplifier increasing this to a factor of 10, it is possible to extract 100 megawatts of peak laser power per pulse at pulse rates depending only in the excitation efficiency of slabs 1 and 2 by source 3. With conventional flashtubes, efficiencies of up to 5% are possible but 1 to 2% more probable. Thererfore, to attain a peak power output of 100 megawatts, the excitation pulse energy would have to be at least 20 joules and more probably 100 joules. At one kilowatt input a pulse rate of 10 per second would be possible at 100 megawatts per pulse. However, for lower power pulses the invention is able to operate at pulse repetition rates up to 1000 Hz. With the inclusion of semiconductor light sources, in particular light emitting diodes in the vicinity of slabs 1 and 2 in FIG. 2, for example, light source 3, can be used to bring the said slabs up to lasing threshold and then the light emitting diodes can be used to excite said slabs well above lasing threshold at overall efficiencies approximating 20%. In this case, very high pulse repetition rates can be achieved in excess of 1kHz at respectable powers. However, under these conditions a continuous wave operation of source 3 may be desirable. Where costs are of no major concern, source 3 can be constructed out of arrays of light emitting diodes so that the invention is fully optimised producing significant output powers per pulse at high repetition rates with minimal demands on the cooling fluids whether they be liquid or gaseous.

By fabricating the slabs out of turnable laser crystals and tuning the oscillator appropriately, it is possible to tune the output of the invention. Limited tuning can also be induced by the inclusion of frequency doubling crystals in the output beam.

The invention has particular application in military systems where high peak laser powers are required, in high quality laser beams at high repetition rates. The invention has general application in any solid state laser utilization where compactness is of prime importance. The invention can operate in a continuous wave mode.

The invention has applications in the defence, industrial and medical fields wherever a powerful, compact laser beam generator is required.

It is emphasised that the above teachings may be modified by those skilled in the art without departing from the spirit of the invention.

I claim:

1. A powerful, compact, slab laser oscillator-amplifier system comprising:
   (a) a slab laser oscillator operating in an open cavity configuration, a slab laser medium having its rear surface coated with a laser beam reflecting mirror and its front surface anti-reflection coated to minimize laser beam reflection losses, said slab laser medium being set parallel to a bevelled laser mirror substrate whose surface facing said slab is coated with a laser beam reflecting mirror and whose rear surface is coated to reflect optical radiation which is used to excite said slab, but not absorbed on its first passage through said slab, back again into its slab for further absorption, the optical cavity of said laser oscillator being defined by two cavity end reflectors, the mirrored bevelled edges of said substrate, the rear mirror of said slab and the mirrored surface of said substrate, a beam path progressing through said slab via a series of reflections off the respective mirrored surfaces of the said slab and optical substrate;

(b) a slab laser amplifier also operating in the open cavity configuration as described for a section of said laser oscillator, a section of said laser amplifier being optically coupled to said laser oscillator section by way of an oscillator output beam being reflected off of at least one laser beam reflecting mirror so that the oscillator output beam is capable of being amplified in said amplifier section from which it is emitted after being reflected off an output bevelled, mirrored edge of the amplifier's optical substrate, said end reflectors of the optical cavity being set relative to each other so that when said slab laser is inserted between them, said laser oscillator is operable and its output laser beam is coupled into said amplifier section; and (c) a common excitation source for the optical excitation of both the oscillator and amplifier slab laser media of the system, said optical excitation source being positioned between and parallel to the oscillator and amplifier sections so that its high power optical light output beam passes through an optical filter for each of the oscillator and amplifier sections into both the oscillator and amplifier sections which minimizes unwanted light and heat allowing only a portion of excitation light source output which matches light absorption bands of the slab laser media to enter said slab via the laser beam reflecting mirrors attached to their rear surfaces, the optical output of the excitation light being in a direction perpendicular to the lengths of the laser media slab in both the oscillator section and the amplifier section, both said excitation source and the rear surface of said slabs being water cooled.

2. A slab laser oscillator-amplifier system as claimed in claim 1 where the slabs are of equal dimensions and whose edges are ground to accept an "O" ring seal.

3. A slab laser oscillator-amplifier system as claimed in claim 1 where the oscillator slab is smaller than the amplifier slab both being optically coupled together via a beam expanding telescope.

4. A system as claimed in claim 3 where a portion of the optical excitation light directed towards the smaller slab is reflected to be partially absorbed in the laser amplifier slab.

5. A system as claimed in claim 1 both with relative position of the slabs and the mirrored, bevelled optical substrate are reversed.

6. A system as claimed in claim 5 where the optical excitation source is removed from between the two bevelled mirrors and positioned behind the rear, mirrored surface of the amplifier slab where its output is not absorbed in the amplifier slab is used to excite the oscillator slab.

7. A system as described in claim 1 where the excitation source is a Xenon flashtube, Xenon arc tube, a semiconductor light source or a combination thereof.

8. A system as described in claim 1 where the laser medium slab is neodynium doped Yttrium Aluminium Garnet.

* * * * *